Dec. 16, 1952  G. E. CONDLIFFE ET AL  2,622,147
FLYING SPOT SCANNING OF CONTINUOUSLY MOVING FILM
Filed Sept. 10, 1948  2 SHEETS—SHEET 1
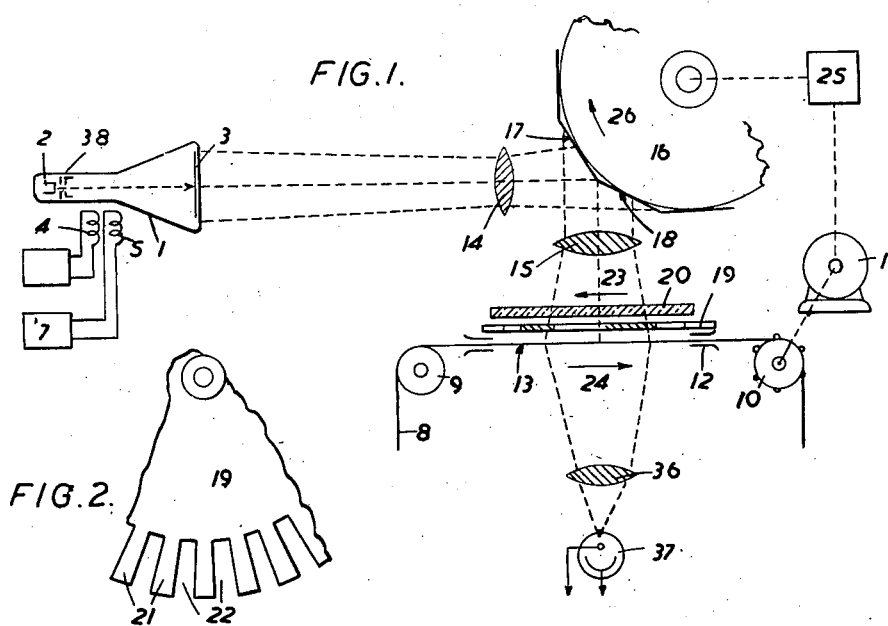
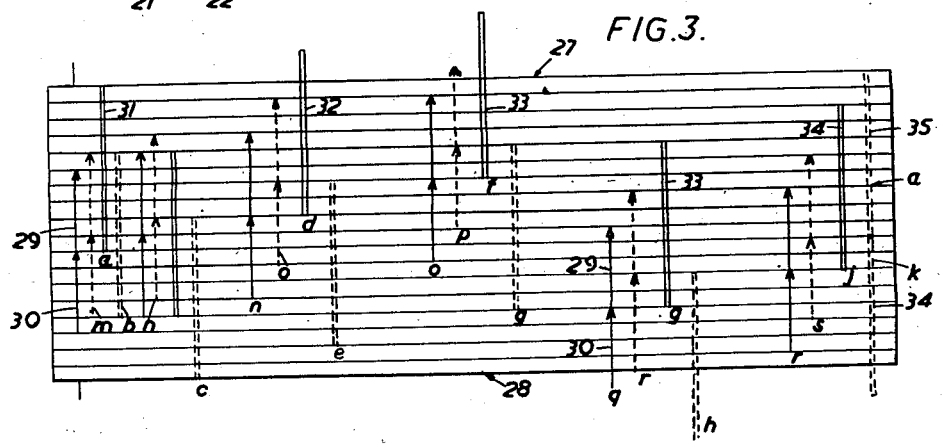
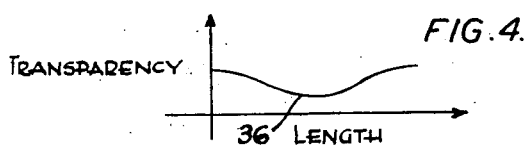
Inventors:
GEORGE EDWARD CONDLIFFE
MAURICE GEOFFREY HARKER
WILLIAM PAUL LUCAS
By
Attorney

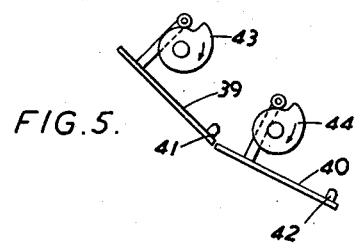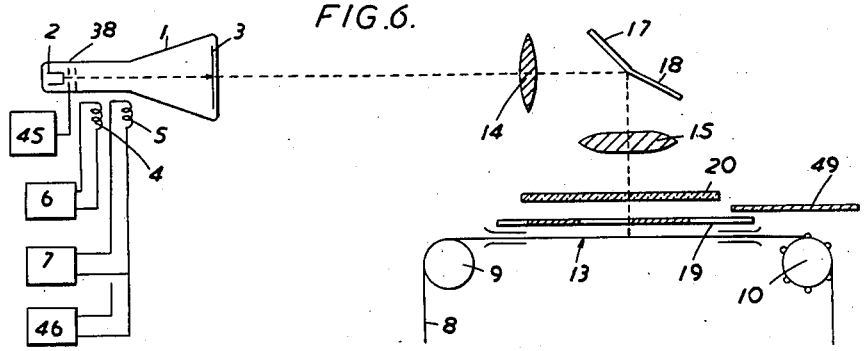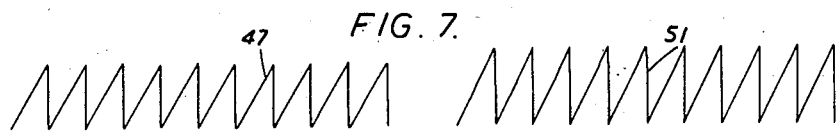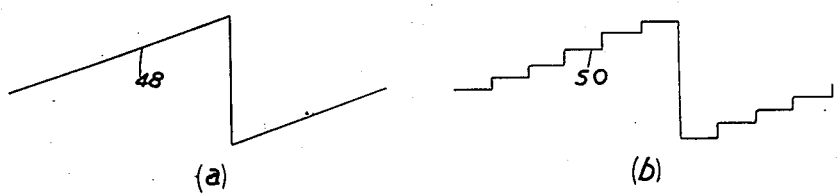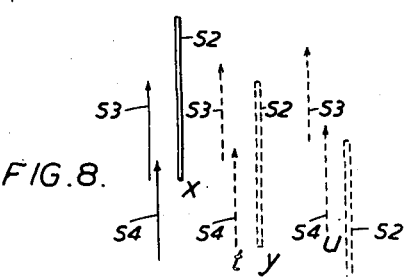
Inventors:
GEORGE EDWARD CONDLIFFE
MAURICE GEOFFREY HARKER
WILLIAM PAUL LUCAS
By
Attorney Patented Dec. 16, 1952

2,622,147

UNITED STATES PATENT OFFICE 2,622,147

FLYING SPOT SCANNING OF CONTINUOUSLY MOVING FILM

George Edward Condliffe, Gerrards Cross, Maurice Geoffrey Harker, Pinner, and William Paul Lucas, Hillingdon, England, assignors to Electric & Musical Industries Limited, Hayes, England, a company of Great Britain Application September 10, 1948, Serial No. 48,722
In Great Britain September 10, 1947

12 Claims. (Cl. 178—7.7)

1

This invention relates to apparatus for effecting interlaced scanning of cinematograph film for the purpose of generating television signals or for recording television signals, comprising means for producing a light image of each field of an interlaced scanning raster, means for continuously moving the film, and means for projecting images of said light image so that the film is exposed successively to a projected image of one field of said raster and to a projected image of the next field of said raster, the second projected image being displaced from the first in the direction of movement of the film whereby each area of the film which is to be scanned is exposed to projected images of two fields of said raster with the lines of one projected image interlacing on the film with the lines of the other projected image.

Apparatus of this kind is hereinafter and in the claims, referred to as apparatus of the kind described, and one form thereof for generating television signals by scanning an exposed cinematograph film is described in United States Patent No. 2,225,033, and another form thereof for recording, on unexposed film, pictures reproduced from television signals is described in the United States Patent Application Serial No. 36,186. It will be understood that the expression "double interlaced scanning raster" which is used herein refers to the path traced out by a scanning spot which effects a complete scanning traversal of an area in two so-called fields each comprising a plurality of lines, the lines of one field interlacing with the lines of the other field.

It is desirable that apparatus of the kind described should be capable of use where the film requires to be moved at a different rate from the scanning rate of the apparatus, that is to say, where the number of film frames which have to be scanned in a given time interval is different from the number of complete scanning traversals effected in that interval, as for example where it is required to scan a standard talking picture film, for which the rate of projection is 24 frames per second, at a scanning rate of 30 complete traversals per second which is the scanning rate adopted in U. S. A. television practice.

The object of the present invention is to provide an improved apparatus of the kind described

2 which is capable of operation in cases such as referred to above.

According to the present invention there is provided apparatus of the kind described comprising means for moving said projected images whereby when the rate at which scanning of said areas of the film is effected differs from the rate of movement of said areas the projected images of alternate frames of said raster can be moved from datum positions at an average rate effectively equal to the difference between said scanning rate and said rate of movement and can be periodically restored to said datum positions.

The restoration of the projected images periodically to said datum positions can be effected in such manner that the projected images can be caused to effect a second complete scanning traversal of an area of the film which has already been exposed to a complete scanning traversal, in the case where the rate of movement of the film is less than the scanning rate, or to omit an area of the film, in the case where the rate of movement of the film is greater than the scanning rate. When the apparatus is employed to generate television signals it is permissible to effect two complete scanning traversals of the same film frame, but when television signals are being recorded it is necessary to provide means for obturating the projected light images when they are in a position in which they would otherwise effect a second complete scanning traversal of an area of the film.

In order that the invention may be clearly understood and readily carried into effect, the same will now be more fully described with reference to the accompanying drawings, in which:

Figure 1 illustrates diagrammatically and partly in block form one example of the present invention applied to apparatus which is capable of scanning a cinematograph film for the purpose of generating television signals.

Figure 2 is a detail view of part of Figure 1,

Figure 3 illustrates graphically the cycle of operation of the apparatus illustrated in Figure 1, when employed to scan an exposed cinematograph film where the rate of movement is 24 film frames per second, the scanning rate being 30 complete scanning traversals per second, Figure 4 is a graph descriptive of part of the apparatus illustrated in Figure 1, Figure 5 is a detail view of a modification of Figure 1, Figure 6 is a diagrammatic view partly in block form of a modified form of the apparatus according to the present invention, applied in this case to apparatus for recording television pictures on unexposed cinematograph film, Figure 7 comprises waveforms explanatory of the operation of Figure 6, and Figure 8 illustrates graphically one method of operating the apparatus illustrated in Figure 5.

Referring to the drawings, the apparatus illustrated in Figure 1 comprises a cathode ray oscillograph tube 1 having an electron gun 2, and a fluorescent screen 3. Scanning coils 4 and 5 are provided to cause scanning deflection of the electron beam generated by the gun 2, the coils 4 and 5 being supplied with sawtooth waveforms of line and field frequency from scanning generators 6 and 7, which cause the beam to produce on the screen 3 a light image of an interlaced scanning raster having its height compressed so that its aspect ratio is double the normal aspect ratio (i. e. the ratio of the width of the field to the height of the frame) of the television system in which the apparatus is employed. The beam of electrons in this application of the invention is unmodulated so that the light image of the scanning raster is of uniform intensity. The film which is to be scanned is indicated at 8 and it is unwound from a reel (not shown) over a guide roller 9 by a sprocket 10 driven by a motor 11 so that the film continuously advances in a longitudinal direction through a gate 12 having an aperture 13. Two images of each light image formed on the screen 3 are projected by means of lenses 14 and 15, and by means of mirrors disposed round the periphery of a drum 16, two of which are indicated at 17 and 18, so that as indicated by the dotted lines the projected images can be focussed on the film 8 in the aperture 13 in dependence upon the position of a shutter 19. The light transmitted by the lens 15, before reaching the aperture 13 passes through a light compensating filter 20 which will be described in more detail hereinafter. The shutter 19 comprises a disc whose axis is normal to the plane of the aperture 13, and as can be seen from the part of the shutter illustrated in plan view in Figure 2, it comprises radial vanes 21 separated by apertures 22, the mean width of the vanes and the apertures being equal to the height of each of the projected images in the aperture 13 (the height being measured from left to right in Figures 1 and 2). The shutter is rotated continuously by the motor 11 via suitable transmission gearing (not shown), and its movement is synchronised with the scanning rate of the television system, so that the number of vanes which move past the aperture 13 in a given time interval is the same as the number of complete scanning traversals which normally occur in that interval.

With the drum 16 held stationary in the position shown in Figure 1, the apparatus can be operated in the manner described in United States Patent No. 2,225,033 to generate television signals by scanning the film 8, when the rate of movement of the film through the gate 13 is the same as the scanning rate of the television system. The lines traced in the projected images of the scanning raster fall successively further to the left (in the drawing) as indicated by the arrow 23, which may be regarded as the longitudinal direction of scanning, and the shutter is rotated so that the vanes 21 move past the aperture 13 also in the direction of the arrow 23, while the film is moved in the direction of the arrow 24 and during each field of the scanning traversals effected by the beam on the screen 3, the film is moved half the standard distance between the centres of successive cinematograph film frames, said distance being referred to for convenience in the claims as the standard height of a cinematograph film frame. During the first field of a complete scanning traversal, an area of the film having the aforesaid normal aspect ratio is exposed to the left-hand projected image of said first field while this area of the film is being moved through the left-hand half of the aperture 13. The same area of the film is thereupon exposed to the right-hand projected image of the second field of the complete scanning traversal while said area is moving through the right-hand half of the aperture 13, the lenses 14 and 15 and the mirrors 17 and 18 being so adjusted that the lines scanned in the second field interlace with the lines in the first, as projected on the film.

In order to enable the apparatus to be used when the rate of movement of the film does not correspond to the scanning rate of the television system, the drum 16 is rotatable, and as shown, it can be driven by the motor 11 through suitable transmission gearing, indicated in block form at 25. It will be apparent that as the drum is rotated the projected light images will be moved with reference to the aperture 13 in the film gate, either in the direction of movement of the film or in the opposite direction according to the direction of rotation of the drum 16. Assuming that the drum is rotated in the direction of the arrow 26, the light images will both be displaced from the positions shown, towards the left. The mirrors are, however, so arranged that after a given displacement of each image, the movement of the corresponding mirror past the lens renders it no longer effective to form one or other of the projected light images, whereupon the next mirror of the drum 16 becomes effective to form the image in a position to the right of the position shown in the drawing. Each light image is in this way effectively restored periodically to a datum position by a sudden movement and by suitably choosing the speed of rotation of the drum 16, it can be arranged that the movements of the images in the intervals between the sudden restoring movements, occur at a rate which equals the difference between the rate of movement of the film and the scanning rate of the television system, thereby compensating for this difference.

In Figure 3 the operation of the apparatus to scan at a rate of 30 complete scanning traversals per second a cinematograph film, whose rate of movement is 24 frames per second, is graphically illustrated. The distance between the horizontal lines 27 and 28 represents the height of the scanning aperture 13 (which as aforesaid is measured from left to right in Figure 1) while the arrows 29 and 30 represent respectively the left and right hand images of the scanning raster on the screen 3 as projected in the aperture. The distance between the lines 27 and 28 is for convenience divided into equal divisions by horizontal lines and it will be observed that the height of each projected image equals five of these divisions. The lines scanned in each image fall in progressively higher positions in Figure 3. The first frame of the film to be scanned is represented by 31 and the scanning is started at the lower edge of the film frame by the image 29 when the film frame is in position $a$, the image 30 being obturated by the shutter 19, and the first field of the scanning traversal is completed by the time the film frame 31 has reached position $b$, the film having moved only a distance represented by four divisions. Therefore in order to cause the image 29 to scan the whole of the film frame the drum 16 is rotated in the direction of the arrow 26 at such speed as to move the projected image 29 by a distance represented by one division in Figure 3 to the position $m$, the projected image 30 being moved by the same distance. During the next field of the complete scanning traversal the projected image 29 is obturated by the shutter 19 and the projected image 30 is allowed to fall on the film frame 31 which is therefore exposed to the second field of the interlaced scanning traversal on the screen 3 while being moved to the position $c$, and while the projected images are moved in the opposite direction to the position $n$. It will be observed that the frame 31 has moved eight divisions while being exposed to a complete scanning traversal, whereas the projected images have been moved longitudinally by two divisions in the opposite direction, this rate of movement of the projected images being equal to the difference between the rate of movement of the film and the scanning rate, since as above stated, the projected images have an aspect ratio double the normal aspect ratio of the television system, so that the longitudinal scanning rate is represented by ten divisions in Figure 3, in the same time interval as that in which the film frame 31 has moved eight divisions. The second film frame 32 is then similarly scanned while it moves from position $d$ to position $e$ and while the projected images move from $n$ to $o$ and thereafter the third film frame 33 is scanned while moving from $f$ to $g$ and while the projected images move from $o$ to $p$. The mirrors 17 and 18, say, have thereupon moved to such positions that further movement will render them ineffective to form the projected images 29 and 30, but the projected images 29 and 30 are formed respectively by the mirror 18 and the next mirror on the drum in the position $q$ so that the projected images are restored by a sudden movement to what may be termed datum positions. The position $q$ of the projected images is arranged to be such that the third frame 33 of the film is scanned a second time while it moves to position $h$ and while the projected images move to position $r$. The fourth film frame 34 is then scanned as it moves from $j$ to $k$ and while the projected images move from $r$ to $s$. The projected images have returned to the position occupied at the commencement of the scanning of film frame 31 and so the fifth frame 35 commences a further cycle of operations which can be repeated indefinitely.

The light compensating filter 20 is provided to compensate for the fact that as the drum 16 rotates the light intercepted by each mirror will vary from a minimum to a maximum and to a minimum again, and the transparency of the filter is arranged to vary inversely. The filter can be formed by replacing the tube 1 by steady light source, by placing a thin glass plate coated with a photographic emulsion in the position occupied by the filter in Figure 1, and then exposing the emulsion to successive projected images of the light source formed by rotating the drum 16 several times. On developing the emulsion, the transparency of the plate will be found to vary in the required manner to compensate for the varying intensity of the projected light images as they are moved by rotation of the drum. The required transparency characteristic of the filter 20 is indicated by the graph in Figure 4, the curve being a relatively wide minimum at 36, in the middle of the filter, and the maximum at opposite ends.

In Figure 1 the image of the light spot which effects the scanning of the film 8 is transmitted with modulated intensity by the film, in dependence upon the transparency thereof, and it is thereupon focussed by means of a lens 36 on a light valve, indicated diagrammatically at 37, where it is utilised in known manner to generate television signals. The apparatus can, however, also be utilised to record television signals on an unexposed film 8, in this case the parts 36 and 37 being dispersed with, and the cathode ray tube 1 replaced by one whose fluorescent screen and whose operating potentials are such that the scanning raster on the fluorescent screen has a contrast characteristic suitable for recording light images on cinematograph films. The television signals to be recorded are in this application of the invention applied to the modulated electrode 38 of the gun 2 so that the electron beam is modulated in intensity in dependence upon the television signals. It is necessary in this case to completely obturate the projected images of the scanning raster while they move from the position $q$ to position $r$ in Figure 3, and this can be achieved by means of an auxiliary shutter moved in synchronism with the shutter 19 but on such matter as to be effective only to obturate light images in positions from $q$ to $r$. Moreover, the mirror drum 16 may be replaced by two pivoted separate mirrors, or prisms, caused by means of cams or the like to execute cyclically a relatively slow rotation through a small angle in one direction, followed by a sudden rotation through the same angle in the opposite direction, the sudden rotation of each mirror or prism occurring during an interval when the light image projected by it is obturated by the shutter 19. Figure 5 illustrates mirrors mounted for operation in this way, the mirrors 39 and 40 being pivoted at their lower edges about axes 41 and 42, normal to the plane of the paper, the mirrors being controlled by means of sawtooth cams 43 and 44 rotatable by means of the motor 11.

The movement of the projected images can be effected alternatively by moving the raster on the screen 3 of the cathode ray tube, by means of a suitable modification of the frame deflecting waveform applied to the scanning coils 5. One example of this form of the invention is illustrated in Figure 6, applied to an apparatus for recording television signals on an unexposed cinematograph film. The television signals to be recorded are fed from a source 45 to the modulator electrode 38 of the cathode ray tube 1, the source 45 being for example the picture signal channel of a conventional television system operating with interlaced scanning. The modification of the field deflecting waveform is effected by means of a circuit shown in block form at 46, the circuit being controlled by the field synchronising signals. The circuit 46 may for example be a sawtooth waveform generator arranged to add to the conventional sawtooth waveform 47 (Figure 7a) of field frequency supplied from the generator 7, a further sawtooth waveform 48 of one-tenth the field frequency of the television system and of an amplitude equivalent to 10 divisions in Figure 3. In this case the motions of the projected images in the film gate aperture 13 will conform to those illustrated in Figure 3. The remainder of the apparatus in Figure 6 is the same as in Figure 1 except that the mirrors 17 and 18 are fixed and the parts 36 and 37 are omitted, and an auxiliary shutter 49 is provided, such that the images in positions $q$ to $r$ are completely obturated. The circuit 46 may alternatively be a step waveform generator arranged to generate a step waveform 50, such as shown in Figure 7b, the steps occurring at field frequency and being of an amplitude equivalent to one division in Figure 3 and a return stroke being generated after every ten steps. This will cause the images, in the intervals between the sudden restorations effected by the return stroke of the waveform 50, to move intermittently, the movements occurring during the field suppression intervals of the television system. In this case it is necessary to increase the amplitude of the saw tooth waveform 51 supplied by the generator 7 by the equivalent of one division, so that the projected images of the raster in the screen 2 have a height equivalent to six divisions in Figure 3, while the optical system has to be such that the projected images overlap by one division. This is illustrated in Figure 8 in which the scanning of one film frame 52 is depicted. The arrows 53 and 54 represent the projected images of the raster at the commencement of the scanning, and the film frame 52 is scanned by the projected image 53 while the film frame 52 moves from the position $x$ to the position $y$, the projected image 54 being obturated. Thereupon, during the field suppression interval of the television system, the projected images 53 and 54 are moved by one division into position $t$ and the film frame 52 is scanned by the projected image 54 to complete the interlaced scanning traversal, while it moves into position $z$. Thereafter, the projected images 53 and 54 are moved by another division to position $u$ and the scanning of the next film frame commences, the complete cycle being similar to Figure 3, apart from the changes involved due to the intermittent movement of the images 53 and 54.

It will be understood that while the invention has been described with reference to the scanning of films whose rate of movements is 24 frames per second at a scanning rate of 30 interlaced traversals per second, the invention is not restricted to this application. Moreover instead of employing the light filter 20 the scanning beam in the tube 1 may be modulated in intensity at frame frequency.

What we claim is:

1. Apparatus for scanning cinematograph film in accordance with a double interlaced television scanning raster having a periodicity differing from an integral multiple of the rate of advancement of the film in frames per second, comprising means for continuously and longitudinally advancing a cinematograph film, means for producing a light image of each field of said interlaced scanning raster, an optical system for projecting the light image of the first of two consecutive fields on to one area on the film path and for projecting the light image of the other of said consecutive fields on to another area on said path displaced from the first in the direction of advance of the film by half the standard height of a cinematograph film frame, and means for displacing said projected images along the path of the film to compensate for the difference between the television scanning periodicity and the rate of advance of the film in frames per second.

2. Apparatus for scanning cinematograph film in accordance with a double interlaced television scanning raster having a periodicity differing from an integral multiple of the rate of advancement of the film in frames per second, comprising means for continuously and longitudinally advancing a cinematograph film, means for producing a light image of each field of said interlaced scanning raster, an optical system for projecting the light image of the first of two consecutive fields on to one area on the film path and for projecting the light image of the other of said consecutive fields on to another area on said path displaced from the first in the direction of advance of the film by half the standard height of a cinematograph film frame, said light image producing means and said optical system being dimensioned to cause the height of each projected image to be half said standard height, and means for displacing said projected images along the path of the film at a uniform rate to compensate for the difference between the television scanning periodicity and the rate of advance of the film in frames per second.

3. Apparatus for scanning cinematograph film in accordance with a double interlaced television scanning raster having a periodicity differing from an integral multiple of the rate of advancement of the film in frames per second, comprising means for continuously and longitudinally advancing a cinematograph film, means for producing a light image of each field of said interlaced scanning raster, an optical system for projecting the light image of the first of two consecutive fields on to one area on the film path and for projecting the light image of the other of said consecutive fields on to another area on said path displaced from the first in the direction of advance of the film by half the standard height of a cinematograph film frame, said light image producing means and said optical system being dimensioned to cause the height of each projected image to be the difference between said standard height and the advance of the film in a television field period, and means for displacing said projected images by a sudden movement along the path of the film between consecutive television fields to compensate for the difference between the television scanning periodicity and the rate of advance of the film in frames per second.

4. Apparatus for scanning cinematograph film in accordance with a double interlaced television scanning raster having a periodicity differing from an integral multiple of the rate of advancement of the film in frames per second, comprising means for continuously and longitudinally advancing a cinematograph film, means including a cathode ray tube having a fluorescent screen for producing a light image on said screen of each field of the television scanning raster, an optical system for projecting the light image of the first of two consecutive fields on to one area of the film path and for projecting the light image of the other of said consecutive fields on to another area on said path displaced from the first in the direction of advance of the film by half said standard height, and said optical system including light deflecting means interposed between said screen and said path, and means for varying the angular disposition of said light deflecting means to displace said projected images along said path to compensate for the difference between the television scanning periodicity and the rate of advance of the film in frames per second, said light deflecting means being arranged periodically to restore the displaced projected images by a sudden movement after a displacement of an integral multiple (including unity) of said standard height.

5. Apparatus for scanning cinematograph film in accordance with a double interlaced television scanning raster having a periodicity differing from an integral multiple of the rate of advancement of the film in frames per second, comprising means for continuously and longitudinally advancing a cinematograph film, means including a cathode ray tube having a fluorescent screen for producing on a single area of said screen a light image of each field of the interlaced scanning raster, an optical system for projecting duplicate images of each light image from said screen onto two areas on the film path displaced from each other by half said standard height, shutter means synchronized with said means for producing the light images for obturating the projected image which would otherwise fall on one of said latter areas during one of two consecutive fields and for obturating the other projected image during the other of said consecutive fields, said optical system including light deflecting means disposed between said screen and said shutter, and means for displacing said light deflecting means angularly to cause said projected images to be displaced along the path of the film to compensate for the difference between the television scanning periodicity and the rate of advance of the film in frames per second, said last-mentioned means being arranged to restore the displaced light deflecting means by a sudden movement after a displacement of said projected images of an integral multiple (including unity) of said standard height.

6. Apparatus for scanning cinematograph film in accordance with a double interlaced television scanning raster having a periodicity differing from an integral multiple of the rate of advancement of the film in frames per second, comprising means for continuously and longitudinally advancing a cinematograph film, means including a cathode ray tube having a fluorescent screen and deflecting circuits for deflecting the cathode ray in said tube in the horizontal and vertical directions to produce on said screen a light image of each field of the interlaced scanning raster, an optical system for projecting the light image of the first of two consecutive fields onto one area on the film path and for projecting the light image of the other of said consecutive fields on another area of said path displaced from the first in the direction of advance of the film by half the standard height of a cinematograph film frame, and means for displacing the cathode ray in said tube in a vertical direction to cause said projected images to be displaced along the path of the film to compensate for the difference between the television scanning periodicity and the rate of advance of the film in frames per second, said last-mentioned means being arranged periodically to restore the displaced cathode ray by a sudden movement after a displacement of the projected images of an integral multiple (including unity) of said standard height.

7. Apparatus for scanning cinematograph film in accordance with a double interlaced television scanning raster having a periodicity differing from an integral multiple of the rate of advancement of the film in frames per second, comprising means for continuously and longitudinally advancing a cinematograph film, means including a cathode ray tube having a fluorescent screen and deflecting circuits for deflecting the cathode ray in said tube in the horizontal and vertical directions to produce on the same area on said screen a light image of each field of said interlaced scanning raster, an optical system for projecting duplicate images of each light image from said screen onto two areas on the path of the film displaced from each other by half the standard height of a cinematograph film frame, shutter means synchronized with said deflecting circuits for obturating the projected image which would otherwise fall on one of said latter areas during one of two consecutive fields and for obturating the other projected image during the other of said consecutive fields, and means for displacing the cathode ray in said tube in a vertical direction to cause said projected images to be displaced along the path of the film to compensate for the difference between the television scanning periodicity and the rate of advance of the film in frames per second, said last-mentioned means being arranged periodically to restore the displaced cathode ray by a sudden movement after a displacement of the projected images of integral multiple (including unity) of said standard height.

8. Apparatus according to claim 5 wherein said light deflecting means comprises a rotatable drum having a plurality of mirrors disposed around its periphery, said drum being arranged to be continuously rotated by said last-mentioned means.

9. Apparatus according to claim 5, including a pivotally mounted member carrying said light deflecting means, said operating means comprising cam mechanism for displacing said member angularly in one direction with a relatively slow speed and periodically in the opposite direction with a relatively high speed.

10. Apparatus according to claim 6 wherein said means for additionally displacing the cathode ray comprises means for generating a periodic sawtooth waveform whose long flank has a slope corresponding to said rate of displacement, and means for utilising said sawtooth waveform to deflect said cathode ray in a vertical direction.

11. Apparatus according to claim 6 wherein said means for additionally displacing the cathode ray comprises means for generating a periodic stepped waveform, the amplitude of whose steps corresponds to said rate of displacement, and means for utilising said stepped waveform to deflect said cathode ray in a vertical direction.

12. Apparatus for scanning cinematograph film in accordance with a double interlaced television scanning raster having a periodicity differing from an integral multiple of the rate of advancement of the film in frames per second, comprising means for continuously and longitudinally advancing a cinematograph film, means for producing a light image of each field of said interlaced scanning raster, an optical system for projecting duplicate images of each light image onto two areas on the film path displaced from each other in the direction of advance of the film by half the standard height of a cinematograph film frame, shutter means for obturating said projected images alternately each for the duration of a television field, said light image producing means and said optical system being dimensioned to cause the height of each projected image to be half said standard height, and means for displacing said projected images along the path of the film at a uniform rate to compensate for the difference between the television scanning periodicity and the rate of advance of the film in frames per second.

GEORGE EDWARD CONDLIFFE.
MAURICE GEOFFREY HARKER.
WILLIAM PAUL LUCAS.

REFERENCES CITED

The following references are of record in the file of this patent:

UNITED STATES PATENTS

| Number | Name | Date |
| --- | --- | --- |
| 2,163,544 | Clothier et al. | June 20, 1939 |
| 2,225,033 | Condliffe | Dec. 17, 1940 |
| 2,287,033 | Goldmark | June 23, 1942 |

FOREIGN PATENTS

| Number | Country | Date |
| --- | --- | --- |
| 521,154 | Great Britain | May 14, 1940 |
| 857,705 | France | Sept. 26, 1940 |